United States Patent [19]
Woods, Jr.

[11] 3,915,078

[45] Oct. 28, 1975

[54] WIND REGULATOR FOR AUTOMOBILE WINDOWS

[76] Inventor: Frank W. Woods, Jr., P.O. Box 16434, San Francisco, Calif. 94116

[22] Filed: Aug. 9, 1974

[21] Appl. No.: 496,098

Related U.S. Application Data

[63] Continuation-in-part of Ser. No. 367,138, June 5, 1973, abandoned.

[52] U.S. Cl. .................................. 98/2.12; 98/2.13
[51] Int. Cl.² ............................................ B60J 1/20
[58] Field of Search ........................... 98/2.12, 2.13

[56] References Cited
UNITED STATES PATENTS

| | | | |
|---|---|---|---|
| 1,741,502 | 12/1929 | Crowell | 98/2.13 |
| 1,943,573 | 1/1934 | Wingert | 98/2.13 |
| 2,011,667 | 8/1935 | Wilson | 98/2.13 |
| 2,025,272 | 12/1935 | Crowell | 98/2.13 |
| 2,034,528 | 3/1936 | Ozkes | 98/2.13 |
| 2,859,680 | 11/1958 | O'Shei | 98/2.13 |

*Primary Examiner*—John J. Camby
*Assistant Examiner*—Henry C. Yuen
*Attorney, Agent, or Firm*—Naylor, Neal & Uilkema

[57] ABSTRACT

A wind regulator for the side window of an automobile, said regulator comprising a sheet of transparent glazing material, such as plastic or glass, having edge portions of reduced thickness for insertion into the channel guides for a windowpane received within the opening. The edge portions are designed for insertion between the windowpane channel and the soft insulating material received therein and are sufficiently thin so as to avoid distorting the insulating material to a point where it interferes with slidable receipt of the windowpane in the channel guides. The regulator has a portion of increased thickness proportioned so as to substantially prevent the passage of air between the regulator and the windowpane when the pane is in apposition to the regulator.

5 Claims, 4 Drawing Figures

WIND REGULATOR FOR AUTOMOBILE WINDOWS

RELATED APPLICATION

This is a continuation-in-part of my co-pending application Ser. No. 367,138, filed June 5, 1973, and entitled AUTOMOTIVE WIND REGULATOR, now abandoned.

BACKGROUND OF THE INVENTION

This invention relates to improvements in wind regulators and, more particularly, to a type of regulator that is especially adapted for use in automobiles having no pivoting wing window within the frame of the front side windows.

In automobiles, it is often desirable for ventilation purposes to roll down the front side vertically movable (v.m.) windowpanes. When such a window is open, without a pivoting wing window to partially deflect undesirable wind, it is found that at medium high speeds air enters the vehicle in such a manner as to be disturbing to both front and rear seat passengers.

It is an object of the present invention to provide a flat, transparent panel which fits into the upper portion of the side window opening of an automobile to prevent the creation of disturbing drafts within the automobile when the vertically movable windowpane within the opening is lowered. The panel fits within the opening on the inside or outside of the vertically movable windowpane and when so installed, in conjuction with the vertically movable windowpane, provides for well-controlled ventilation of the interior of the automobile.

Another object of the invention is to provide such a transparent plastic panel which contains its own adhesive agent and provides for simple and either permanent or removable installation.

Still another object of the invention is to provide such a transparent plastic panel which is so proportioned that its edge portions may be inserted between guide channels of a window opening and the soft insulating material received therein without so distorting the insulating material as to interfere with slidable movement of a windowpane within the channels.

Yet another object of the invention is to provide such a panel wherein the main body of the panel is so proportioned and of such a thickness that when the panel is received within a window opening and the pane within the opening is in apposition to the panel, no appreciable airflow is permitted between the panel and the pane.

SUMMARY OF THE INVENTION

The wind regulator of the present invention is for use in combination with an automobile windowpane vertically slidable within a window opening extending in a fore and aft direction and having an upper channel lined with a soft, insulating material for slidable receipt of the upper edge of the pane. The regulator comprises an elongate, transparent member proportioned for receipt in the window opening so as to extend lengthwise thereof, which member has an upper edge engagable in the upper channel of the window opening and a lower edge inclined relative to the upper edge so as to slope downwardly and rearwardly of the window opening when the upper edge of the member is engaged in the upper channel. A portion of reduced thickness is formed on the upper edge of the member and that portion is insertable between one side of the upper channel and the insulating material received therein. A portion of increased thickness is formed on the member beneath the portion of reduced thickness and so proportioned as to extend closely adjacent the surface of the windowpane of a window opening within which the member is received to prevent any appreciable airflow between said portion of increased thickness and the windowpane when in apposition therewith.

BRIEF DESCRIPTION OF THE DRAWINGS

The foregoing and other objects and the construction and mode of operation of the invention will become more apparent when viewed in light of the following description of the preferred embodiment and the accompanying drawings wherein.

DESCRIPTION OF THE PREFERRED EMBODIMENT

Figure 1:
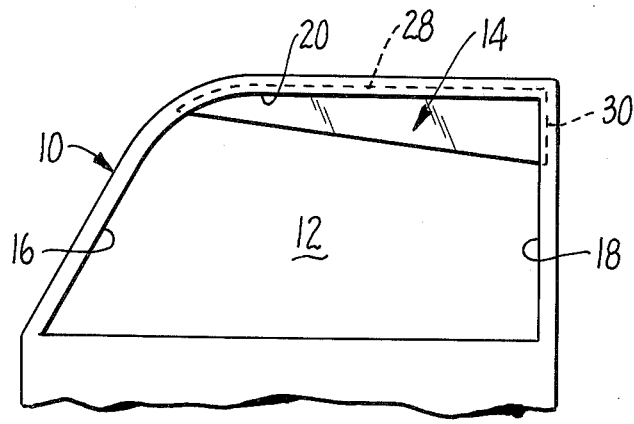
FIG. 1 is an elevational view from the outside of an automobile showing a side window opening of the automobile with the windowpane in the full down position and the improved wind regulator of the present invention fitted into position on the inside of the windowpane.

Referring to FIG. 1, the numeral 10 designates the side door of an automobile having a window opening 12 therein with no pivoting wing window. As shown in FIG. 1, the conventional vertically movable (v.m.) windowpane is in the full down position and, therefore, not visible. The improved wind regulator of the present invention is designated in FIG. 1 by the numeral 14.

The side and top edges of the window opening 12 are defined by channels 16, 18 and 20 disposed for slidable receipt of a windowpane 22 received within the window opening. The channels are lined with soft insulating material 24 (See FIG. 4) having grooves 26 formed therein for slidable guiding receipt of the pane 22. Although FIG. 4 shows only the upper channel 20 and the insulating material 24 received therein, it is to be understood that the channels 16 and 18 are lined with similar insulating material having grooves formed therein for receipt of the windowpane.

Figure 4:
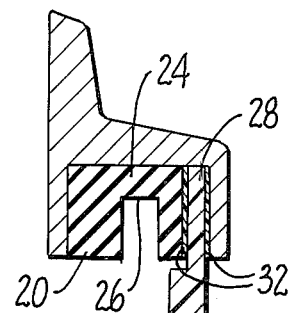
Figure 2:
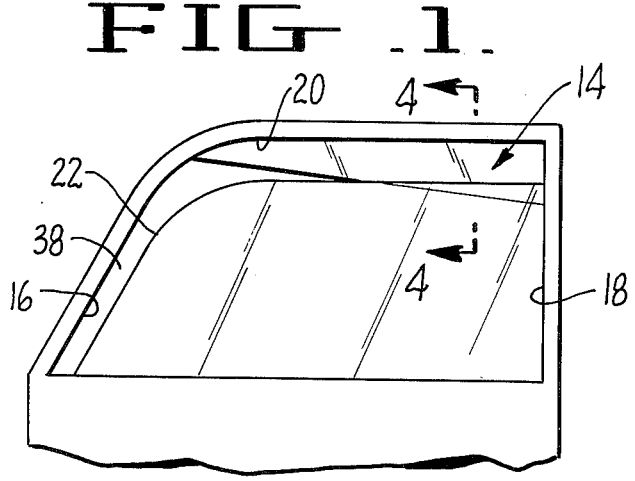
FIG. 2 is an elevational view similar to FIG. 1, showing the windowpane in a partially raised position in partial apposition to the wind regulator.

As shown in FIGS. 1, 2 and 4 of the drawings, the wind regulator 14 is disposed inwardly of the windowpane 22. The top and rear edge portions of the regulator, designated 28 and 30, respectively, are received within the channels 20 and 18 between the inner surface of the channels and the insulating material 24 received therein (See FIG. 4). Contact adhesive 32 disposed on either side of the edge portions 28 and 30 adheres the edge portions to the channels and the insulating material therein.

Figure 3:
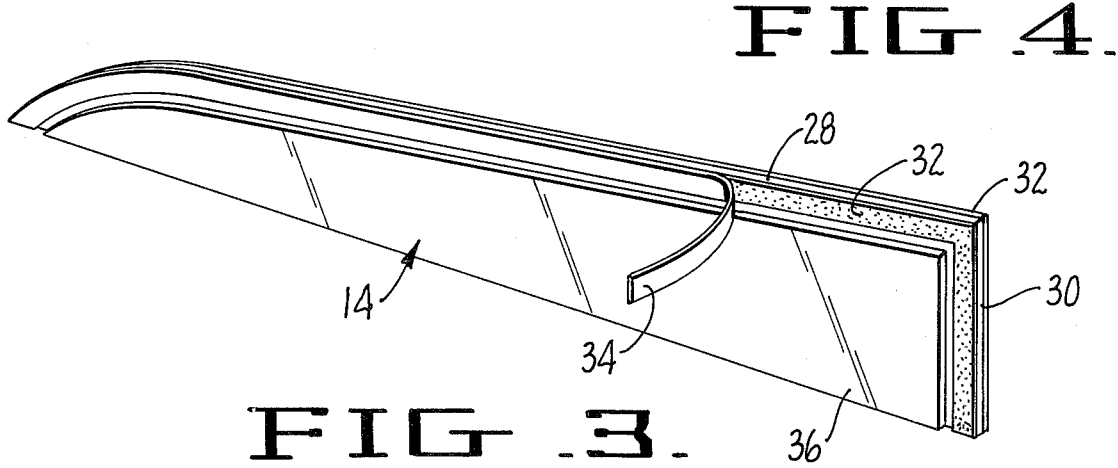
FIG. 3 is a perspective view illustrating the wind regulator of the present invention prior to its installation into the window opening of an automobile; and, FIG. 4 is a cross-sectional view taken on the plane designated by line 4—4 in FIG. 2.

The detailed construction of the regulator 14 may best be seen from FIG. 3 wherein the regulator is shown in a condition removed from a window opening. This is the condition in which the regulator is normally marketed. The regulator comprises a rigid member or panel formed of transparent plastic glazing material, such as that known as "PLEXIGLAS" or other material of similar characteristics. In the pre-installation condition shown in FIG. 3, the sides of the edges 28 and 30 have applied thereto the contact adhesive 32. Ideally, this adhesive is originally shielded with a protective tape 34 which is removed prior to installation of the regulator. As shown in FIG. 3, the tape is partially removed from the adhesive 32 facing the viewer.

The body of the regulator inwardly of the edge portions 28 and 30 is designated by the numeral 36 and, as may be seen from FIGS. 3 and 4, has an increased thickness relative to the edge portions. The increased thickness adds to the strength of the regulator and, more importantly, controls the clearance between the regulator and a windowpane in apposition thereto so as to substantially prevent the flow of air between the regulator and the pane. As will be seen from FIG. 4, the regulator has a stepped cross-sectional configuration whereby the portions 36 extend toward the windowpane (22) in apposition thereto.

The purpose of forming the edge portions 28 and 30 of reduced thickness, as compared to the body 36, is to assure that the edge portions will not be so thick as to compress the insulating material 24 to an extent wherein it closes the grooves 26 to a point which might interfere with slidable movement of a windowpane within the grooves. Ideally, the thickness of edge portions 28 and 30 should be such that these portions may be inserted between the window opening channel and the insulating material received therein without the necessity of cutting or routing away any of the insulating material. In practice, it has been found that the edge portions should ideally have a thickness of 0.040 inches or less. The thickness of the body 36 may vary, depending upon the characteristics of the automobile with which it is used. For general purposes, however, a thickness of 0.125 inches or more has been found ideal for the body. It has also been found ideal to so portion the body 36 that the clearance between the body and a windowpane in apposition thereto is no more than one-sixteenth of an inch. This limited clearance assures that no appreciable airflow occurs between the regulator and the windowpane.

The shape of a window opening and the windowpane received therein differs in various makes of automobiles and, hence, the specific shape of the regulator of the present invention may also vary. The regulator is not intended to be limited to any specific automobile design, although it is anticipated that it will find use primarily in automobiles having framed side windows (as shown in FIG. 1). Although the lower edge of the regulator has been shown as being a straight line, this may vary as is necessary to attain the most desirable wind regulating characteristics. The regulator is tapered from front to rear in such a manner as to increase its vertical area from front to rear.

In the preferred embodiment, the regulator is fabricated as an integral member. There are several methods of manufacture available for the regulator, including injection molding, die stamping, and other means of cutting, shaping or forming flat, transparent plastic sheet material.

OPERATION OF THE SYSTEM

In most automobiles having no pivoting wing windows in the front window frames, when the vertically movable windowpane is lowered, it also separates in rearward movement from the forward part of the window frame. This creates an air gap, designated 38 in FIG. 2, at the forward and upper areas of the window. When in position, the wind regulator of the present invention covers a portion of the upper air gap. As the vertically movable windowpane is lowered (See FIG. 2), the opening between the wind regulator and the windowpane increases both in size and in a rearward direction.

Experiments with vehicles having no pivoting wing window in the front side windows have shown that, as the vehicle moves through the air, currents are forced around the windshield and past the side windows. This passage of air causes a low pressure area to exist at the outside, forward portion of the vertically movable windowpane. When the windowpane is lowered slightly, this low pressure area causes a vacuum to draw air from the vehicle through the air gap at the forward area of the window, while allowing air to enter the vehicle in the upper area of the window. Experiments have further shown that the admission of air through the upper air gap of the window and, more particularly, the upper rear area thereof, causes the undesirable ventilation characteristics that are common in vehicles having no pivoting wing window in the forward side of the window frame. It is these characteristics that the improved wind regulator of the present invention is designed to overcome. By covering the upper air gap area and being shaped in such a manner as to open a progressively large area to the rear of the windowpane as it is lowered, the regulator allows the person operating the windowpane to regulate the flow of air into and out of the vehicle much more efficiently than is possible through employment of the windowpane alone.

As described above, the regulator is constructed of transparent material containing its own adhesive and is shaped to fit a window frame without interfering with normal vertical movement of a pane within the frame. Although the regulator has been illustrated and described as being on the inside of the windowpane, it should be understood that, as an alternative, it might be disposed on the outside of the pane. The windowpane retains its full travel characteristics and is in no way restricted by the regulator, although the regulator and pane may contact.

CONCLUSION

Although a preferred embodiment of the invention has been illustrated and described, it should be understood that the invention is not intended to be limited to this embodiment, but rather is defined by the following claims.

What is claimed is:

1. In combination with an automobile windowpane vertically slidable within a window opening extending in a fore and aft direction and having an upper channel lined with a soft, insulating material for slidable receipt of the upper edge of the pane, an improved wind regulator insertable in said opening and comprising: an elongate rigid transparent member received in the window opening so as to extend lengthwise thereof, said member having an upper edge extending along the upper channel of the window opening and a lower edge inclined relative to the upper edge so as to slope downwardly and rearwardly of the window opening; a portion of reduced thickness formed on the upper edge of the member, said portion being received within said upper channel between one side of the channel and the insulating material received therein with one side of the portion in facing engagement with the channel and the side of said portion opposite said one side in facing engagement with the insulating material received within the channel; and, a portion of increased thickness formed on the member beneath said portion of reduced thickness, said portion of increased thickness being proportioned so as to extend closely adjacent the surface of the windowpane to prevent any appreciable airflow between said portion of increased thickness and the windowpane when in apposition therewith.

2. The combination according to claim 1, wherein the window opening has a generally vertically extending rearward channel intersecting the upper channel and lined with a soft, insulating material for slidable engagement with the rearward edge of the windowpane and wherein a portion of reduced thickness is formed on the rearward edge of the member and received between one side of the rearward channel and the insulating material received therein.

3. The combination according to claim 1, wherein the portion of reduced thickness is coated with contact cement on at least one side thereof to provide for adhesion of said portion within the channel.

4. The combination according to claim 1, wherein the portion of reduced thickness has a thickness of 0.040 inches or less and the portion of increased thickness has a thickness of 0.125 inches or more.

5. The combination according to claim 1, wherein the member is so proportioned relative to the window opening and pane that the portion of increased thickness is positioned so as to be spaced no more than one-sixteenth of an inch from the windowpane when the pane is in apposition to the member.

* * * * *